No. 617,443. Patented Jan. 10, 1899.
A. LINDGREN.
SEEDING MACHINE.
(Application filed June 28, 1898.)
(No Model.) 3 Sheets—Sheet 1.

WITNESSES: INVENTOR
August Lindgren
BY
Phil. T. Dodge
ATTORNEY.

Figure 2:
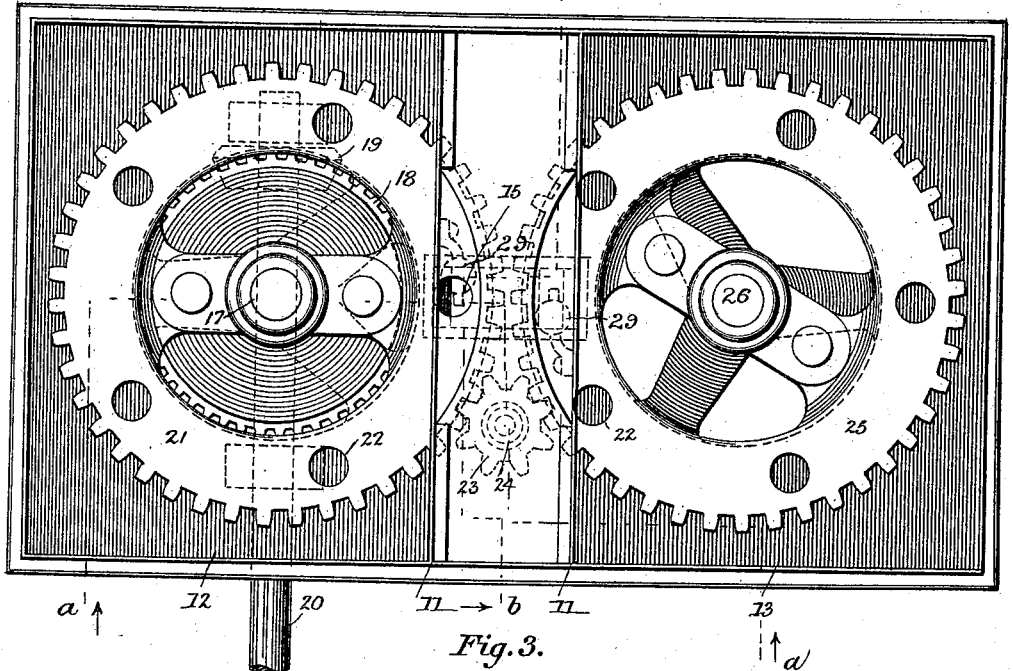

No. 617,443. Patented Jan. 10, 1899.
A. LINDGREN.
SEEDING MACHINE.
(Application filed June 28, 1898.)
(No Model.) 3 Sheets—Sheet 2.

on line a—a of fig 2.

WITNESSES: INVENTOR
August Lindgren
BY
ATTORNEY.

No. 617,443. Patented Jan. 10, 1899.
A. LINDGREN.
SEEDING MACHINE.
(Application filed June 28, 1898.)
(No Model.) 3 Sheets—Sheet 3.

WITNESSES:
Arthur Ashley
J. S. Elmore.

INVENTOR
August Lindgren
BY
Phil T Dodge
ATTORNEY.

UNITED STATES PATENT OFFICE.

AUGUST LINDGREN, OF MOLINE, ILLINOIS, ASSIGNOR TO THE MOLINE PLOW COMPANY, OF ILLINOIS.

SEEDING-MACHINE.

SPECIFICATION forming part of Letters Patent No. 617,443, dated January 10, 1899.

Application filed June 28, 1898. Serial No. 684,683. (No model.)

*To all whom it may concern:*

Be it known that I, AUGUST LINDGREN, of Moline, county of Rock Island, and State of Illinois, have invented a new and useful Improvement in Seeding-Machines, of which the following is a specification.

The object of my invention is to produce a seeding-machine of simple construction by which different kinds of seed, such as corn and beans, may be planted in alternate hills in a row; and the invention consists in combining with a suitable frame provided with a seed tube or spout two horizontal rotary dropping-plates, each provided at intervals with seed-cells, the arrangement being such that the cells in the respective plates will register alternately with the seed-tube, whereby the different seed may be discharged alternately as the machine advances.

The invention also consists in the details of construction and combination of parts hereinafter described and claimed.

Figure 1:
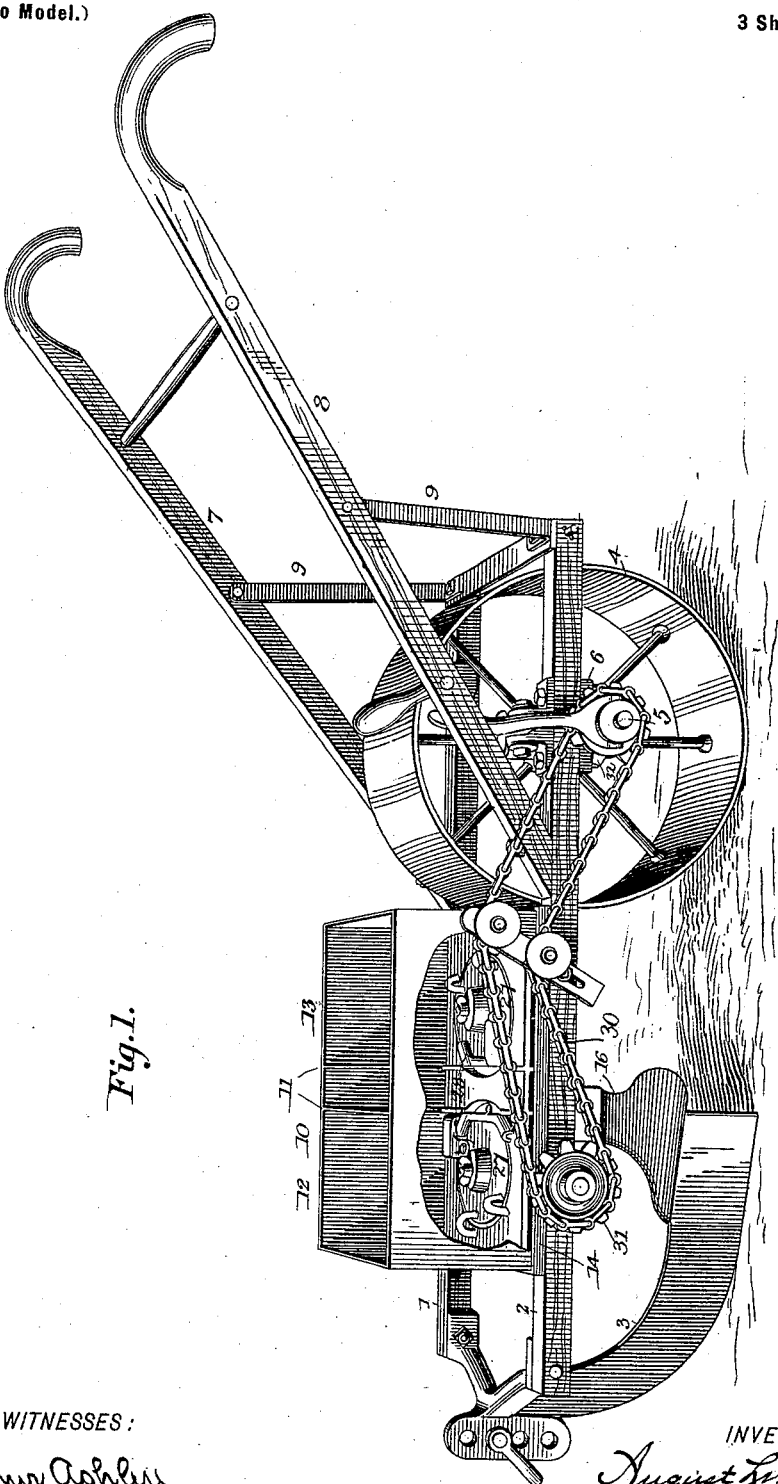
Figure 3:
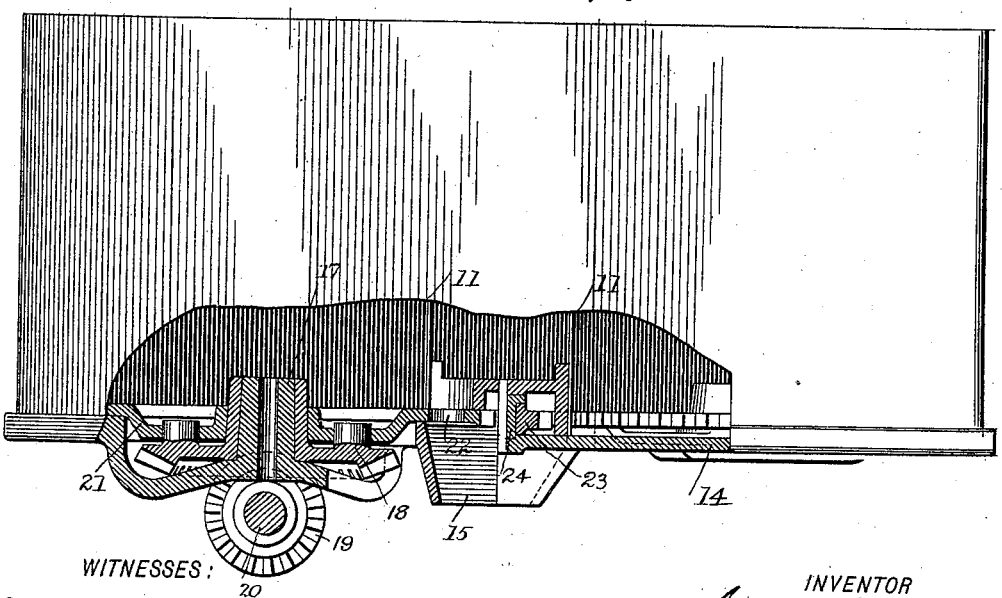
Figure 4:
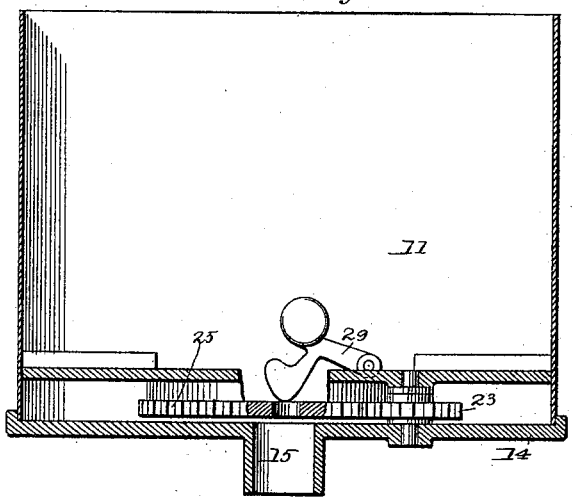
Figure 5:
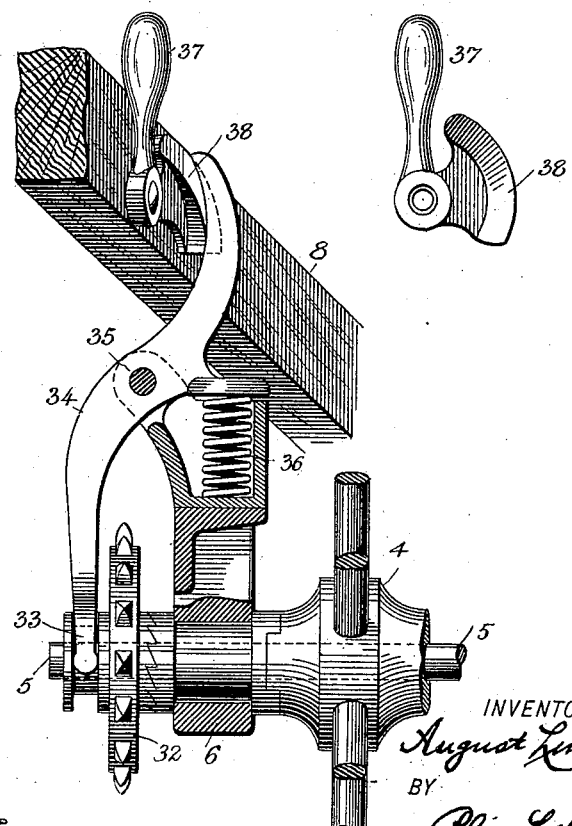

In the accompanying drawings, Figure 1 is a perspective view of my machine with the seed hopper or box broken away to expose the internal mechanism. Fig. 2 is a plan view of the seed-dropping mechanism. Fig. 3 is a longitudinal sectional elevation through the same and adjacent parts on the line $a\ a$ of Fig. 2. Fig. 4 is a transverse section on the line $b\ b$ of Fig. 2. Fig. 5 is a transverse sectional elevation through the axle of the ground-wheel and the adjacent parts, showing the clutch mechanism.

Referring to the drawings, my improved machine comprises two longitudinal parallel frame-bars 1 and 2, sustained at their forward ends by a runner 3 and at their rear ends by a ground-wheel 4, mounted loosely on an axle 5, sustained in bearings 6 on the under side of the frame-bars. Handles 7 and 8 extend rearwardly and upwardly from the frame-bars from a point in advance of the axle and are braced to the rear end of the frame-bars by vertical struts 9.

10 represents a seed hopper or box divided by two transverse partitions 11, extending a short distance apart, into a forward seed-compartment 12 for one kind of seed, such as corn, and a rear seed-compartment 13 for another kind of seed, such as beans. This hopper is sustained by a base-plate 14, fixed to the upper side of the frame-bars, and the plate is formed with a central seed-opening 15, communicating with the upper end of a seed-discharge tube 16, whose lower end is connected, as usual, to the rear end of the runner. In the bottom of the seed-compartment 12 the base-plate is formed with an upwardly-extending central stud 17, on which is mounted a horizontal bevel gear-wheel 18, driven by a vertical bevel-gear 19, keyed to a transverse driving-shaft 20, mounted in bearings on the under side of the frame-bars. A rotary dropping-plate 21 is fixed to the upper side of the gear 18 and is provided at intervals with seed-cells 22, arranged near the periphery of the plate in a position to pass over the opening 15 in the base-plate. This dropping-plate has its edge toothed and gives motion to a pinion 23, mounted on a stud 24, projecting upward from the surface of the base-plate. This pinion in turn drives a second toothed dropping-plate 25, mounted in the bottom of the rear seed-compartment 13 on a stud 26, projecting upward from the base-plate. This dropping-plate, like that described, is provided at intervals with seed-cells arranged near its periphery in position to pass over the central seed-opening 15 in the base-plate. The two dropping-plates are so arranged with relation to each other that the cells in the respective plates will register alternately with the seed-opening in the base-plate, thus insuring the dropping of the seed from the two compartments alternately into the upper end of the seed-tube. As a result of this construction and arrangement, assuming that the front seed-compartment is supplied with corn and the rear with beans, the dropping mechanism will act as the machine is advanced to deposit the corn and beans alternately in the spout, thereby planting in a single row alternate hills of corn and beans. The dropping mechanism is covered by the usual covering-plates 27, situated in the bottom of the compartments, and are provided, respectively, with seed cut-offs 28 to control the entrance of the overlying seed to the cells. On the adjacent faces of the two partitions 11 I pivot two knockers 29, consisting of pivoted weighted dogs adapted to bear on the respective dropping-plates over the opening of the base-plate and in the line of the seed-cells. These knockers serve to discharge any grains which may have a tendency to lodge in the cells.

Motion is imparted to the driving-shaft 20 and thence to the dropping mechanism by means of a chain 30, passing over a sprocket-wheel 31 on the end of the drive-shaft, and a sprocket-wheel 32, mounted loosely on the end of the axle 5 and adapted to be clutched to the ground-wheel by the mechanism shown more particularly in Fig. 5. Here it will be seen that the sprocket-wheel is mounted on the axle to move to a limited extent longitudinally and has the inner end of its hub toothed to engage corresponding teeth on the outer end of the hub of the ground-wheel. The outer end of the hub of the sprocket-wheel is formed with a peripheral groove embraced by the lower forked end 33 of a clutch-lever 34, mounted on a longitudinal axis 35 on a bracket rising from the frame-bar 2. Adjacent to the axis of the clutch-lever it is acted on by a spring 36, which tends to hold the lower end of the lever inward and force the sprocket-wheel into engagement with the ground-wheel. In order to throw the lower end of the lever outward to disengage the clutch, I provide a hand-lever 37, pivoted on the inner side of the handle 8 and formed with a cam-surface 38, engaged by the upper end of the clutch-lever. When the hand-lever is pulled rearward, it will move the higher part of the cam against the end of the clutch-lever, thereby throwing the lower end of the clutch-lever outward and disengaging the clutch. When the hand-lever is moved forward, the spring, acting on the clutch-lever, will throw the lower end of the lever inward, thereby engaging the sprocket-wheel with the ground-wheel.

It will be observed that my machine is of extreme simplicity, the seed-dropping mechanism comprising merely two rotary dropping-plates, with seed-cells arranged to register alternately with a single opening in the base-plate communicating with the seed-tube, by which mechanism two kinds of seed, such as corn and beans, may be planted in alternate hills in a row. It will also be observed that the single conduit into which the dropping-plates discharge is wholly unobstructed or free from any valves, so that the different seed dropped by the two plates alternately into this conduit will be deposited in the ground alternately or in alternate hills.

Having thus described my invention, what I claim is—

1. In a seeding-machine the combination with the frame provided with a single unobstructed seed-conduit, of two horizontal rotary dropping-plates formed with seed-cells, the cells in the respective plates adapted to discharge alternately into the conduit whereby the seed dropped alternately by the two plates in the conduit will be deposited alternately in the ground.

2. In a seeding-machine the combination with the frame provided with a single unobstructed seed-conduit, of two dropping-plates provided each with seed-cells arranged to discharge alternately, means for rotating one of the plates, and a pinion driven thereby and engaging the other plate.

In testimony whereof I hereunto set my hand, this 13th day of June, 1898, in the presence of two attesting witnesses.

AUGUST LINDGREN.

Witnesses:
F. G. ALLEN,
A. W. WAY.